United States Patent

[11] 3,627,269

[72] Inventor Oscar W. Olson
3613 37th Ave. N.E., Minneapolis, Minn. 55421
[21] Appl. No. 56,505
[22] Filed July 20, 1970
[45] Patented Dec. 14, 1971
Continuation-in-part of application Ser. No. 834,962, June 20, 1969. This application July 20, 1970, Ser. No. 56,505

[54] VEHICLE BUMPER JACK AND CONVERSION KIT
10 Claims, 10 Drawing Figs.
[52] U.S. Cl. .................................................. 254/99
[51] Int. Cl. .................................................. B66f 3/08
[50] Field of Search ....................................... 254/1, 99, 133, 134, 108

[56] References Cited
UNITED STATES PATENTS
2,719,696  10/1955  Palka .......................... 254/99 X
2,887,289  5/1959  Palka .......................... 254/99 X
3,240,471  3/1966  Townsend .................... 254/134 X Primary Examiner—Andrew R. Juhasz
Assistant Examiner—David R. Melton
Attorney—Burd, Braddock & Bartz ABSTRACT: A stable multilegged vehicle bumper jack utilizing a removable single-post ratchet or screwjack. The conventional standard equipment single-post automobile jack is convertible to a safer more stable multilegged jack by incorporation into an auxiliary supporting frame which per se comprises a conversion kit. The jack is characterized by a fixed base movably supporting the jack column to permit variations of the angle of the jack column to compensate for differences due to lifting of the vehicle bumper, so as to avoid compensating movement of the supporting legs which are rigidly secured together.

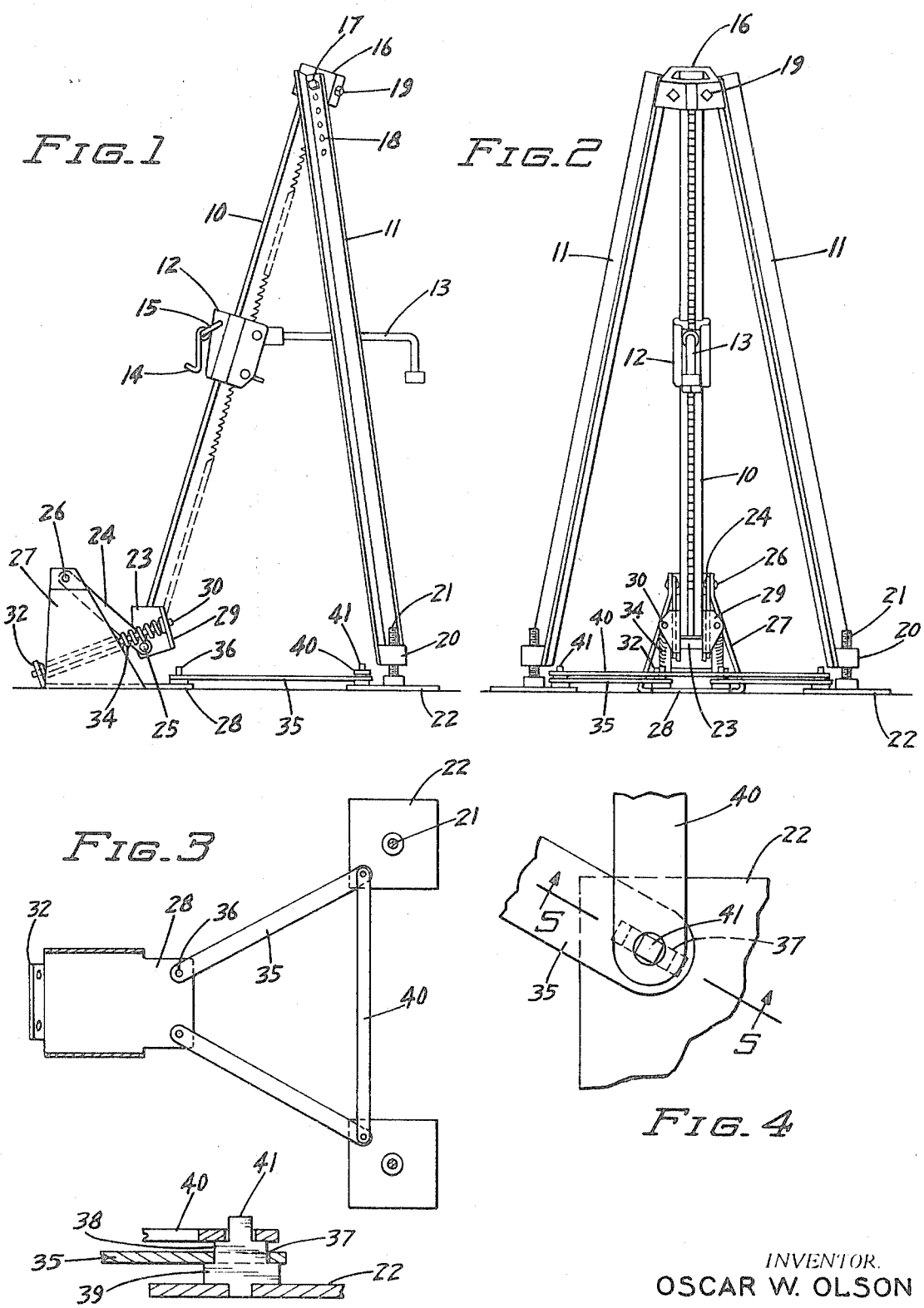

INVENTOR.
OSCAR W. OLSON
BY Burd, Braddock & Bartz
ATTORNEYS

VEHICLE BUMPER JACK AND CONVERSION KIT

This application is a continuation-in-part of my copending application Ser. No. 834,962, filed June 20, 1969.

This invention relates to vehicle bumper jacks and more particularly to multilegged bipod and tripod jacks and means for converting the conventional standard equipment single-post automobile bumper jack into an improved multilegged jack.

Single-post bumper jacks, unless used with great care, tend to be unstable. They are inclined to tip over or slide out from under the lifted vehicle, especially when used on unlevel ground surfaces, frequently causing injury to the vehicle, or operator using the jack, or both. For many years countless numbers of single-post bumper jacks have been furnished as standard equipment with automobiles. They are known to have good lifting mechanism able to lift and hold the vehicle, but they lack stability.

Double-legged or bipod jacks and three-legged or tripod jacks have been available and offer some added stability to a raised vehicle. However, such jacks have other defects and disadvantages. In both bipod and tripod jacks, the main lifting post is at an angle offset from vertical in the longitudinal fore and aft directions. This angle of the main lifting column causes the bumper-engaging or lifting lugs to have horizontal displacement in the longitudinal direction proportional to the vertical distance raised. Therefore, as the bumper is raised, the lifting lug causes the main lifting column to pivot forwardly in order to follow the vehicle bumper. In doing so, the lifting column tends to lift the supporting legs off the ground. On ground surfaces that are not level, the feet of the supporting legs seek out the ground surface. Whatever the angle of the ground may be in the longitudinal direction, this same angle is automatically transmitted to the main lifting column, adding to or substracting from its angle so that the lifting column is no longer at its best working angle.

In a tripod jack, the main lifting column should be positioned vertically in the sideway or lateral direction so that the supporting legs evenly share the load. Should the ground surface slope toward either side, the main lifting member is no longer vertical and the jack tends to be unstable.

It is the principal object of this invention to provide a safer improved multilegged jack incorporating the conventional single-post jack but converting it into a multilegged jack overcoming the faults of both conventional single-post jacks and conventional bipod and tripod jacks.

It is also an object of this invention to provide supporting legs adjustably attachable to the conventional single-post jack to match its length so as to position the main lifting column at the optimum stable angle for nonlevel ground surface conditions.

It is another object of this invention to provide rigid but easily removable linkages between the multiple jack legs so that in the remote possibility that the lifting mechanism should stick in the "up" position, the links can be removed and the supporting legs moved so that the car may roll off the jack.

It is a further object of this invention to provide an improved yieldable and pivotally movable support means for the main lifting column of the jack so that upon application of the load the main lifting column may move forward while retaining its optimum angle and the supporting legs stay in place and remain in contact with the ground to carry their share of the load throughout the lift.

It is a still further object of the invention to provide a simple form of bumper-engaging lifting lug flexibly connected to the main lifting column to compensate for sideward movement that takes place as the vehicle is lifted.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIG. 1 is a side elevation of a tripod jack according to the present invention and incorporating a conventional single-post ratchet automobile bumper jack;

FIG. 2 is a front elevation of the tripod jack;

FIG. 3 is a top plan view of the ground-engaging supporting feet of the tripod jack and their rigid connecting links;

FIG. 4 is an enlarged fragmentary detail plan view showing the manner of rigidly but removably connecting the links to the feet members;

FIG. 5 is a vertical section on the line 5—5 of FIG. 4 and in the direction of the arrows;

Figure 6:
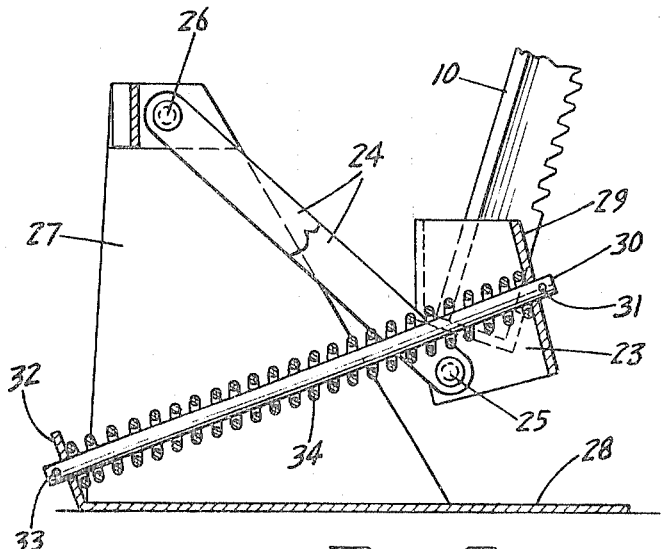
FIG. 6 is an elevation showing the supporting foot for the main lifting column, partly broken away and partly in section.
Figure 7:
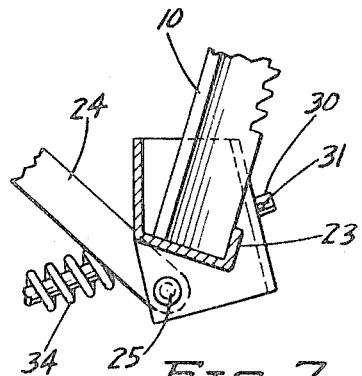
FIG. 7 is a fragmentary elevation in section showing the means for engaging and supporting the lower end of the main lifting column.

Referring now to the drawings, and particularly to FIGS. 1, 2 and 3, there is shown a tripod jack comprising the lifting column 10 of a conventional standard equipment single-post ratchet automobile bumper jack and a pair of supporting legs 11. A conventional ratchet mechanism 12 engages the toothed column 10 in the usual manner. The ratchet mechanism 12 is operable by means of a handle, such as a lug wrench 13. The ratchet mechanism 12 supports a lifting lug or hook 14 which desirably is flexibly attached by means of a triangular ring 15 so as to permit both pivotal movement of the lifting lug and lateral movement to compensate for any sideways movement of the vehicle. A resilient pad is desirably secured to the shank of the lifting lug 14 to act as a buffer to prevent the vehicle bumper from being marred by sideways motion of the lug.

The top end of the legs 11 are secured to the top of jack post 10 by means of a five-sided tubular adapter bracket 16. Each leg 11 is secured to the outside surface of top bracket 16 by means of screws 17 extending through one of a plurality of longitudinally aligned holes 18, which are provided to permit accommodation of main lifting columns of varying lengths. A small pivotal movement between legs 11 and adapter bracket 16 is permitted as the angle of the main lifting column changes in operation of the jack. Bracket 16 in turn is rigidly secured in the top end of the jack post 10 by means of screws 19.

The bottom end of each leg 11 is provided with an internally threaded block member 20 welded thereto and adapted to receive the threaded shank of screw 21 whose head is welded or otherwise secured to footplate 22. Adjustable feet 22 permit vertical adjustment of the legs to compensate for irregular ground surfaces.

The bottom end of jack post 10 engages a cuplike saddle member 23. Saddle 23 is supported by a pair of rigid spaced-apart parallel swinging links 24 which are pivotally connected at one end at 25 to the saddle and pivotally connected at the other end at 26 to a pair of spaced-apart upright plates 27 comprising part of the foot 28 for the lifting member. Saddle 23 is provided with a pair of laterally extending ears 29 each having an opening through which a rod or shaft 30 extends, retained by a pin 31. The opposite end of each of rods 30 extends through a hole in an upturned projection 32 at the forward edge of foot 28, being retained therein by means of pin 33. Rods 30 act as guides for saddle 23 in its longitudinal swinging motion at the end of swinging links 24 generally in a plane perpendicular to the pivot axis 25. A resistance means, such as heavy coil spring 34, cushions the swinging movement of the saddle 23 as the saddle and lifting post move forward under the weight of the vehicle as the vehicle is being raised. This results in pivotal movement of lifting post 10 relative to supporting legs 11 by virtue of the pivotal connections 17.

To maintain the stability of the jack, the feet are rigidly linked together but the links are readily removable. As best seen in FIGS. 3, 4 and 5, foot 28 is connected to each of feet 22 by means of rigid links 35. The end of each link 35 connected to foot 28 is provided with a circular opening which fits over a post or pin 36 projecting upwardly from the upper surface of foot 28. The opposite end of each link 35 is provided with a longitudinal slot 37 which engages a key 38 of corresponding shape and dimensions which comprises part of a connecting member 39 secured to the upper surface of each of feet 22. Pins 36 and connector 39 both have appropriate spacers to maintain the links evenly spaced above the surfaces of the feet. Connectors 39 are each nonrotatably secured to the feet 22. A rigid link 40 interconnects the two feet 22 of the supporting legs 11. Link 40 is provided with a hole at each end, each of which engages a top post 41 of connector 39 for rigid connection but easy removal.

It will be seen that as the vehicle is raised as a result of engagement of the vehicle bumper with lifting lugs 14 through operation of ratchet mechanism 12, the angle of lifting post 10 is maintained at the proper angle as a result of the bottom end of the post cradled in saddle 23 swinging downwardly and forwardly under the weight of the vehicle against the tension of springs 34 and supported by swinging links 24. The supporting legs 11 remain stationary, lifting post 10 moving pivotally relative to the top ends of those legs.

Figure 10:
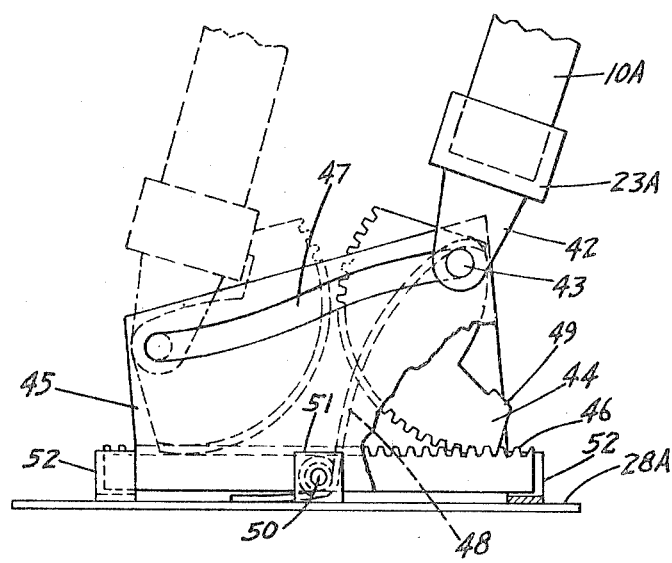
FIG. 10 is an elevation, partly broken away, showing an alternative supporting foot for the main lifting column.
Figure 8:
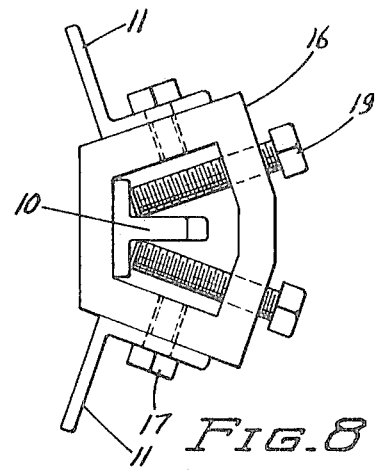
FIG. 8 is a fragmentary top plan view showing the means for engaging the upper end of the main lifting column and connecting the same to the multiple supporting legs, showing the main lifting column as a ratchet having a T cross section.

In FIG. 10, there is shown an alternative foot for movably supporting the main lifting column. The conventional standard equipment jack post 10A is seated in a bifurcated saddle member 23A whose downwardly extending legs 42 carry a pin or shaft 43 which extends through an eccentric pinion gear 44. Gear 44 is housed between a pair of parallel spaced-apart vertical plates 45 extending upright relative to the base of foot 28A and spaced slightly above the upper surface of the baseplate of foot 28A. The teeth of gear 44 mesh with the teeth of a horizontal rack 46 disposed between the spaced-apart parallel vertical plates 45 adjacent to the bottom edges of the plates and secured thereto. Plates 45 and rack 46 are journaled on shaft 50 whose ends are carried in bushings 51 for slight rocking movement. The ends of the rack 46 desirably extend beyond the ends of plates 45 and are engaged in channel members 52 which function as guide means for the rocking plates and rack. Plates 45 are each provided with a longitudinal slot 47 through which pin 43 extends. Pin 43, and saddle 23A carrying jack post 10A are normally urged toward the upper end of slot 47 by resistance means, such as a pair of strong springs 48 extending between pin 43 and shaft 50. Alternative foot member 28A may be substituted for foot 28, as shown in FIGS. 1, 2 and 3.

In the normal operation of the modified form of jack, as the vehicle bumper is lifted as a result of operation of ratchet mechanism 12 on the jack post 10A, the jack post is maintained at the proper angle as a result of swinging downward along the path of slot 47 as the teeth of the rotating gear 44 engage the teeth of horizontal rack 46 moving against the tension of spring 48. In its ultimate position, as seen in broken lines in FIG. 10, the pin has traversed the length of slots 47 and stop member 49 on gear 44 engages the jack column. Legs 11 remain stationary as jack column 10A moves pivotally relative to the legs. The rocking rack and plate assembly may move slightly to compensate for shifting due to irregularities in the lifting action or ground surface.

Figure 9:
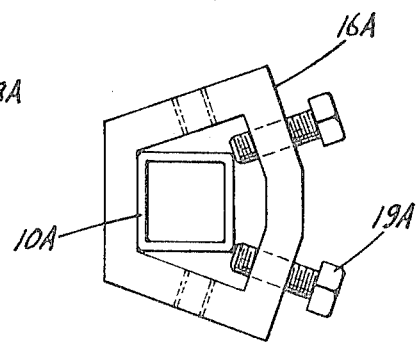
FIG. 9 is a similar fragmentary top plan view of means for engaging a tubular column ratchet jack for connection to the supporting legs.

In FIG. 9, there is shown an alternative form of adapter bracket 16A for securing a conventional standard equipment jack 10A of square tubular cross section into the frame of the present invention for converting a single-post jack to a multipost jack. Although the invention is described in detail with reference to a tripod jack, the principles of the invention may be incorporated into a bipod jack.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A vehicle bumper jack comprising:
   A. an elongated lifting column having lifting means movable along the column and means for moving the lifting means,
   B. a ground-engaging frame including at least two supporting feet and at least one supporting leg for supporting said lifting column, one of said supporting feet being secured to the bottom end of said supporting leg,
   C. top bracket means for securing the upper end of said lifting column to the upper end of said supporting leg for pivotal movement relative thereto,
   D. cradle means movably supported in said other supporting foot for supporting the bottom end of said lifting column,
   E. said cradle means being movable pivotally about a horizontal axis spaced from and substantially parallel to the ground surface and movable longitudinally in a plane perpendicular to said axis,
   F. guide means for longitudinal movement of said cradle,
   G. resistance means for controlling the rate of longitudinal movement, and
   H. link means rigidly connecting said supporting feet.

2. A vehicle bumper jack according to claim 1 further characterized in that said lifting column is removably secured between said top bracket and said cradle.

3. A vehicle bumper jack according to claim 1 further characterized in that said supporting foot for the lifting column includes a base and a pair of spaced-apart upright plates, said cradle being supported by and movable pivotally and longitudinally relative to said plates.

4. A vehicle bumper jack according to claim 3 further characterized in that:
   A. said cradle is pivotally supported at one end of a pair of spaced-apart parallel rigid swinging links, and
   B. the opposite ends of said links are pivotally supported from said upright plates.

5. A vehicle bumper jack according to claim 4 further characterized in that:
   A. said guide means comprise a pair of parallel elongated rods disposed on opposite sides of said cradle in sliding engagement with the cradle, and
   B. said resistance means are coil springs disposed around said rods.

6. A vehicle bumper jack according to claim 1 further characterized in that:
   A. said cradle is pivotally supported relative to an eccentric pinion gear disposed between a pair of spaced-apart parallel upright plates spaced above said supporting foot base,
   B. a horizontal rack is supported between said plates and secured thereto, the teeth of said pinion gear engaging the teeth of said rack, and
   C. said rack and plates are rockably supported above said base.

7. A vehicle bumper jack according to claim 6 further characterized in that:
   A. said upright spaced-apart plates are provided with corresponding elongated slots serving as guide means for the cradle,
   B. said cradle is pivotally secured to said pinion gear by a pin extending through said gear and said slots, and
   C. said resistance means comprise spring means engaging said pin and said supporting foot for the lifting column.

8. A vehicle bumper jack according to claim 1 further characterized in that said jack is a tripod jack having two supporting legs, each with a supporting foot.

9. A vehicle bumper jack according to claim 8 further characterized in that:

A. said supporting foot for the lifting column is connected to each of the supporting feet for the supporting legs by means of a rigid link removably secured to said feet, and
B. said supporting feet for the supporting legs are interconnected by means of a further rigid link removably secured to said feet.

10. A vehicle bumper jack according to claim 1 further characterized in that a plurality of longitudinally aligned securing means are provided adjacent the upper ends of said supporting legs for connection to said top bracket, whereby the effective lengths of said supporting legs may be varied to accommodate lifting columns of varying lengths.

* * * * *